UNITED STATES PATENT OFFICE.

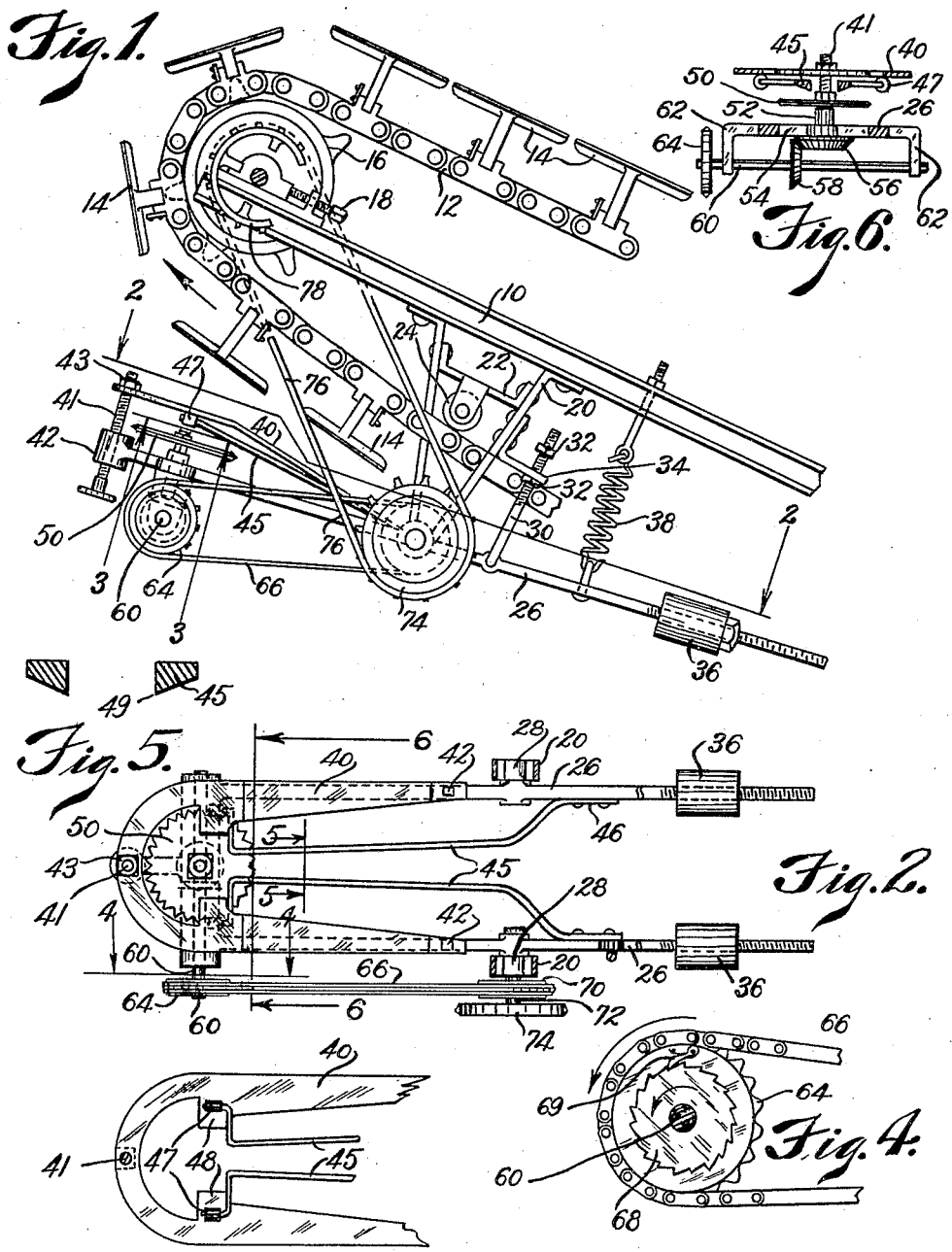

GEORGE B. HAYES AND WALTER A. HAYES, OF DENVER, COLORADO.

BEET-TOPPING DEVICE.

1,390,289.    Specification of Letters Patent.    Patented Sept. 13, 1921.

Application filed January 22, 1919. Serial No. 272,452.

*To all whom it may concern:*

Be it known that we, GEORGE B. HAYES and WALTER A. HAYES, citizens of the United States, residing at the city and county of Denver and State of Colorado, have invented certain new and useful Improvements in Beet-Topping Devices; and we do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to topping devices for beet harvesters, and its objects are to compensate for bodily vertical movement of beets when passing the cutter, to accommodate beets of different sizes, to control the depth of the cut when removing the tops, to drive the cutter without disturbing its equilibrium, and to relieve the dead weight of the cutter from the beets. This is a continuation in part of our application Serial No. 68,604, filed December 27th, 1915.

Briefly, the invention comprises a frame, pivotally mounted on a support connected with the framework of the harvester, the frame carrying at one end a cutter with which a spring guide coöperates, this spring guide being adjustable with respect to the cutter, and including separable spring fingers. Mounted on the axis of the pivot of the frame is a power drive connection, this mounting preventing the balance of the cutter frame from being disturbed. On the end of the frame opposite from the cutting device, counterweights are provided to take the dead weight from the beets as they pass the cutter.

In the drawings:

Figure 1 is a side elevation, showing a portion of the beet harvester and conveyer on which is mounted the present invention.

Fig. 2 is in general a plan of the cutter as indicated by line 2—2 of Fig. 1.

Fig. 3 is a fragmentary detail of a portion of the spring guiding device as indicated by line 3—3 of Fig. 1.

Fig. 4 is an elevational detail on the line 4—4 of Fig. 2.

Fig. 5 is a section on line 5—5 of Fig. 2.

Fig. 6 is a section on line 6—6 of Fig. 2.

The frame 10 of the beet harvester has a conveyer 12 running thereover, this conveyer carrying foliage-grasping devices 14. The conveyer 12 passes over a sprocket 16, adjustably mounted on the framework 10 through the medium of a screw 18, as shown. Depending from the framework 10 are brackets 20, between the parts of which cross-arms, 22, are positioned. These arms 22 carry rollers or pulleys 24, which engage the conveyer 12 to definitely position the section of the conveyer between the sprocket 16 and the pulleys 24. A frame 26 is pivoted at 28 in the lower ends of the brackets 20. To one of the members of the frame 26 a link 30 is connected, on the outer end of which nuts 32 are threaded to coöperate with an arm 34, to limit the swinging motion of the frame 26. On the ends of the frame 26 counterweights 36 are provided and between these weights and the link 32 a spring 38 is connected both to the frame 26 and to the harvester framework 10, to normally retain the counterweights 36 in their uppermost position.

On the opposite end of the cutter frame 26 a spring plate 40 has its ends secured, as indicated at 42. The normal tendency of this plate is upward, and its free end is adjustably held by means of a screw 41 threaded into a boss 42, on the frame 26, and retained in engagement with the plate 40 by means of a nut 43. Separable spring arms 45 are riveted or otherwise secured to the frame 26 at 46, the ends of these fingers being provided with anti-friction rollers 47, which engage the under faces of projections 48 of the spring plate 40. The inner or opposing lower edges 49 are sharp, in order to firmly engage the beets as they are moved to the cutter 50. The normal tendency of these spring arms 45 is toward each other and upward, against the plate 40, so that the rollers 47 are always in engagement with the projections 48. The cutter disk 50 which may be toothed as shown, is mounted in the frame 26, as shown at 52, this mounting being on a cross-bar 54, of the frame. The lower end of the cutter shaft carries a bevel gear 56, which meshes with bevel gear 58 on a shaft 60, mounted in ears 62, formed on the cutter frame. The outer end of the shaft 60 carries a sprocket 64, over which a chain 66 passes to a sprocket 70, mounted on a stub shaft 72, which constitutes one of the bearings 28 for the frame 26, and carries on its outer end a sprocket 74. A chain 76 connects the sprocket 74 with a sprocket 78, mounted on the same shaft as that on which sprocket 16 is mounted, whereby the cutter is driven when the beet conveyer 12 advances.

In order that the cutter may not be stopped suddenly in case the harvester is stopped, a ratchet 68 is fixed to the shaft 60 and a spring-pressed pawl 69 is mounted on the sprocket 64, which is loose on the shaft 60. Thus, when the chain 66 and sprocket 64 suddenly stop, the ratchet 68 will continue its movement together with the shaft 60 and the rest of the cutting mechanism. By this means strain on the cutter is avoided upon sudden stoppage of the machine.

If desirable, however, the cutting mechanism may be driven by a power device such as a gasolene engine, mounted upon the harvester frame and operable independently thereof so that the operation of the cutter may be controlled at will and be run steadily when desired.

From the foregoing, it will be understood that when the conveyer 12 advances with beets carried by the gripping devices 14, the beets themselves will be drawn in between the spring arms 45 the cutting edges 49 sinking into the beets and firmly engaging them as they are guided to the cutting disk 50. As the conveyer 12 moves upwardly away from the cutter and toward the sprocket 16, the cutting device will swing on its pivotal mounting until the beets have been severed from the tops by the disk 50. The cutter will then fall back into its balanced position, as determined by the lower one of the nuts 32. The depth of cut may be determined by adjusting the outer end of the plate 40 by means of thumb screw 41, as above indicated. It is evident that different sized beets will separate the spring fingers 45 according to the size of the beets.

We claim:

1. In a beet topping device, a support, a cutter frame mounted thereon, a cutter on the frame, beet guiding means coöperating with the cutter and comprising a spring plate and separable guiding fingers, and means to operate the cutter.

2. In a beet topping device, a support, a cutter frame mounted thereon, a cutter on the frame, adjustable beet-guiding means coöperating with the cutter, and means to operate the cutter, said guiding means comprising a spring plate, means to adjust the plate to regulate the depth of cut and spring fingers engaged by said plate and having their position determined thereby.

3. In a beet topping device, a support, a cutter frame mounted thereon, a cutter on the frame, adjustable beet-guiding means coöperating with the cutter, means to operate the cutter, said guiding means comprising a spring plate, separable spring fingers, and means to adjust the plate to regulate the depth of cut.

4. In a beet topping device, a support, a cutter frame mounted thereon, a cutter on the frame, adjustable beet-guiding means coöperating with the cutter, and means to operate the cutter, said guiding means comprising a plate and separable spring fingers having rollers on the ends thereof to engage one face of said plate.

5. In a beet topping device, a support, a cutter frame mounted thereon, a cutter on the frame, adjustable beet-guiding means coöperating with the cutter, and means to operate the cutter, said guiding means comprising a plate and separable spring fingers having rollers on the ends thereof to engage one face of said plate, said arms having lower opposing sharp edges to engage the beets.

6. In a beet topping device, a support, a cutter frame mounted thereon, a cutter on the frame, adjustable beet guiding means coöperating with the cutter, and means to operate the cutter, said guiding means comprising separable spring fingers whose lower edges are adapted to engage the beets.

7. In a beet topping device, a support, a cutter frame mounted thereon, a cutter on the frame, adjustable beet-guiding means coöperating with the cutter, means to operate the cutter, said guiding means comprising separable spring fingers, and lower opposing edges are adapted to engage the beets.

8. A beet topping device, comprising a support, a cutter frame pivotally mounted thereon, a cutter on the frame, means on the axis of said pivotal mounting and connected with the cutter to drive the same and means on said frame to guide beets to said cutters.

9. A beet topping device, comprising a support, a cutter frame, pivotally mounted thereon, a cutter on the frame, driving mechanism for said cutter, including a power transmission, and means to allow said cutter to rotate when power is cut off from said transmission.

10. A beet topping device, comprising a support, a cutter frame pivotally mounted thereon, a cutter on the frame driving mechanism for said cutter, including a power transmission, and means to allow said cutter to rotate when power is cut off from said transmission, said means comprising a pawl and ratchet.

11. A beet topping device, comprising a support, a cutter frame pivotally mounted thereon, a cutter on one end of said frame and cutter balancing means on the other end, and means mounted on the axis of said pivotal mounting and connected with the cutter to drive the same and means on said frame to guide beets to said cutters.

In testimony whereof we affix our signatures.

GEORGE B. HAYES.
WALTER A. HAYES.